(12) United States Patent
Andrews et al.

(10) Patent No.: US 8,587,422 B2
(45) Date of Patent: Nov. 19, 2013

(54) OCCUPANT SENSING SYSTEM

(75) Inventors: David Andrews, Ortonville, MI (US);
Jason Lisseman, Shelby Township, MI (US); Jerome Bosch, Romeo, MI (US)

(73) Assignee: TK Holdings, Inc., Auburn Hills, MI (US)

( * ) Notice: Subject to any disclaimer, the term of this patent is extended or adjusted under 35 U.S.C. 154(b) by 190 days.

(21) Appl. No.: 13/074,830

(22) Filed: Mar. 29, 2011

(65) Prior Publication Data
US 2011/0241860 A1  Oct. 6, 2011

Related U.S. Application Data

(60) Provisional application No. 61/319,621, filed on Mar. 31, 2010.

(51) Int. Cl.
*B60Q 1/00* (2006.01)

(52) U.S. Cl.
USPC .......................................... 340/438; 340/988

(58) Field of Classification Search
USPC ............... 340/438, 988, 901; 701/45
See application file for complete search history.

(56) References Cited

U.S. PATENT DOCUMENTS

| | | | |
|---|---|---|---|
| 4,268,815 A | 5/1981 | Eventoff et al. |
| 4,276,538 A | 6/1981 | Eventoff et al. |
| 4,301,337 A | 11/1981 | Eventoff |
| 4,314,227 A | 2/1982 | Eventoff |
| 4,314,228 A | 2/1982 | Eventoff |
| 4,315,238 A | 2/1982 | Eventoff |
| 4,451,714 A | 5/1984 | Eventoff |
| 4,489,302 A | 12/1984 | Eventoff |
| 4,739,299 A | 4/1988 | Eventoff et al. |
| 4,810,992 A | 3/1989 | Eventoff |
| 4,963,702 A | 10/1990 | Yaniger et al. |
| 5,053,585 A | 10/1991 | Yaniger |
| 5,159,159 A | 10/1992 | Asher |
| 5,186,055 A | 2/1993 | Kovacich et al. |
| 5,209,967 A | 5/1993 | Wright et al. |
| 5,262,778 A | 11/1993 | Saunders |

(Continued)

FOREIGN PATENT DOCUMENTS

| | | |
|---|---|---|
| DE | 60011078 T2 | 6/2005 |
| DE | 60210951 T2 | 1/2007 |

(Continued)

OTHER PUBLICATIONS

Copending U.S. Appl. No. 13/074,739, filed Mar. 29, 2011.

(Continued)

*Primary Examiner* — Shirley Lu
(74) *Attorney, Agent, or Firm* — Meunier Carlin & Curfman, LLC

(57) ABSTRACT

An occupant sensing system for a vehicle includes a pressure sensitive material installed in one or more pressure sensing zones in or around at least one vehicle seat. The pressure sensitive material of each zone is configured to provide an electrical signal to a controller when pressure is applied. The controller determines at least one of occupant presence, position, and classification based on the electrical signal. The pressure sensitive material has at least one of a variable resistance and a variable capacitance based on the amount or type of pressure that is applied to the material. The at least one of a variable resistance and a variable capacitance changes characteristics of the electrical signal.

18 Claims, 5 Drawing Sheets

(56) References Cited

U.S. PATENT DOCUMENTS

| | | |
|---|---|---|
| 5,296,837 A | 3/1994 | Yaniger |
| 5,302,936 A | 4/1994 | Yaniger |
| 5,365,671 A | 11/1994 | Yaniger |
| 5,510,783 A | 4/1996 | Findlater et al. |
| 5,659,334 A | 8/1997 | Yaniger et al. |
| 5,670,988 A | 9/1997 | Tickle |
| 5,828,363 A | 10/1998 | Yaniger et al. |
| 5,847,639 A | 12/1998 | Yaniger |
| 5,854,625 A | 12/1998 | Frisch et al. |
| 5,907,419 A | 5/1999 | Martinelli et al. |
| 5,943,044 A | 8/1999 | Martinelli et al. |
| 5,982,519 A | 11/1999 | Martinelli et al. |
| 6,084,572 A | 7/2000 | Yaniger |
| 6,239,790 B1 | 5/2001 | Martinelli et al. |
| 6,291,568 B1 | 9/2001 | Lussey |
| 6,388,556 B1 | 5/2002 | Imai et al. |
| 6,396,523 B1 | 5/2002 | Segal et al. |
| 6,429,846 B2 | 8/2002 | Rosenberg et al. |
| 6,437,682 B1 | 8/2002 | Vance |
| 6,495,069 B1 | 12/2002 | Lussey et al. |
| 6,529,122 B1 | 3/2003 | Magnussen et al. |
| 6,531,951 B2 | 3/2003 | Serban et al. |
| 6,538,643 B2 | 3/2003 | Mori et al. |
| 6,563,415 B2 | 5/2003 | Armstrong |
| 6,646,540 B1 | 11/2003 | Lussey |
| 6,690,365 B2 | 2/2004 | Hinckley et al. |
| 6,750,803 B2 | 6/2004 | Yates et al. |
| 6,758,689 B1 | 7/2004 | Bair et al. |
| 6,765,557 B1 | 7/2004 | Segal et al. |
| 6,791,532 B2 | 9/2004 | Hirano et al. |
| 6,801,191 B2 | 10/2004 | Mukai et al. |
| 6,809,280 B2 | 10/2004 | Divigalpitiya et al. |
| 6,820,804 B2 | 11/2004 | Segal et al. |
| 6,822,640 B2 | 11/2004 | Derocher |
| 6,850,221 B1 | 2/2005 | Tickle |
| 6,861,961 B2 | 3/2005 | Sandbach et al. |
| 6,875,938 B2 | 4/2005 | Schmiz et al. |
| 6,888,537 B2 | 5/2005 | Benson et al. |
| 6,909,354 B2 | 6/2005 | Baker et al. |
| 6,947,031 B2 | 9/2005 | Sandbach et al. |
| 6,995,752 B2 | 2/2006 | Lu |
| 7,050,045 B2 | 5/2006 | Baker et al. |
| 7,084,859 B1 | 8/2006 | Pryor |
| 7,091,436 B2 | 8/2006 | Serban |
| 7,091,998 B2 | 8/2006 | Miller-Smith |
| 7,112,755 B2 | 9/2006 | Kitano et al. |
| 7,113,179 B2 | 9/2006 | Baker et al. |
| 7,154,484 B2 | 12/2006 | Komata |
| 7,158,122 B2 | 1/2007 | Roberts |
| 7,161,460 B2 | 1/2007 | Federspiel |
| 7,170,428 B2 | 1/2007 | Himberg et al. |
| 7,176,889 B2 | 2/2007 | Baker et al. |
| 7,190,348 B2 | 3/2007 | Kennedy et al. |
| 7,213,323 B2 | 5/2007 | Baker et al. |
| 7,215,330 B2 | 5/2007 | Rantet |
| 7,250,940 B2 | 7/2007 | Jayanetti et al. |
| 7,295,904 B2 | 11/2007 | Kanevsky et al. |
| 7,301,435 B2 | 11/2007 | Lussey et al. |
| 7,310,089 B2 | 12/2007 | Baker et al. |
| 7,324,095 B2 | 1/2008 | Sharma |
| 7,336,260 B2 | 2/2008 | Martin et al. |
| 7,345,675 B1 | 3/2008 | Minakuchi |
| 7,356,769 B2 | 4/2008 | Lehtonen |
| 7,377,133 B2 | 5/2008 | Sandbach et al. |
| 7,388,571 B2 | 6/2008 | Lowles et al. |
| 7,432,459 B2 | 10/2008 | Stoschek et al. |
| 7,468,199 B2 | 12/2008 | Divigalpitiya et al. |
| 7,511,702 B2 | 3/2009 | Hotelling |
| 7,518,381 B2 | 4/2009 | Lamborghini et al. |
| 7,554,045 B2 | 6/2009 | Sandbach et al. |
| 7,554,051 B2 | 6/2009 | Crispin |
| 7,554,531 B2 | 6/2009 | Baker et al. |
| 7,573,464 B2 | 8/2009 | Baker et al. |
| 7,576,294 B2 | 8/2009 | Clemens et al. |
| 7,603,917 B2 | 10/2009 | Graham et al. |
| 7,614,008 B2 | 11/2009 | Ording |
| 7,619,616 B2 | 11/2009 | Rimas-Ribikauskas et al. |
| 7,629,966 B2 | 12/2009 | Anson |
| 7,683,889 B2 | 3/2010 | Rimas-Ribikauskas et al. |
| 7,683,890 B2 | 3/2010 | Geaghan |
| 7,693,631 B2 | 4/2010 | Yukawa et al. |
| 7,721,609 B2 | 5/2010 | Wright |
| 7,724,242 B2 | 5/2010 | Hillis et al. |
| 7,733,209 B2 | 6/2010 | Kurtz |
| 7,746,327 B2 | 6/2010 | Miyakoshi |
| 7,772,960 B2 | 8/2010 | Baker |
| 7,773,075 B2 | 8/2010 | Otsuka et al. |
| 7,777,730 B2 | 8/2010 | Geurts et al. |
| 7,791,596 B2 | 9/2010 | Errico et al. |
| 7,808,488 B2 | 10/2010 | Martin et al. |
| 7,813,774 B2 | 10/2010 | Perez-Noguera |
| 7,822,443 B2 | 10/2010 | Kim et al. |
| 7,863,822 B2 | 1/2011 | Stoschek et al. |
| 7,898,381 B2 | 3/2011 | Hatsuda |
| 7,898,530 B2 | 3/2011 | Trachte |
| 7,903,090 B2 | 3/2011 | Soss et al. |
| 7,952,566 B2 | 5/2011 | Poupyrev et al. |
| 7,973,773 B2 | 7/2011 | Pryor |
| 7,989,725 B2 | 8/2011 | Boddie et al. |
| 8,022,933 B2 | 9/2011 | Hardacker et al. |
| 8,026,902 B2 | 9/2011 | Medler et al. |
| 8,026,906 B2 | 9/2011 | Mölne |
| 8,035,535 B2 | 10/2011 | Nousiainen |
| 8,037,770 B2 | 10/2011 | Larson et al. |
| 8,049,730 B2 | 11/2011 | Joguet et al. |
| 8,049,731 B2 | 11/2011 | Baker et al. |
| 8,049,737 B2 | 11/2011 | Cho et al. |
| 8,059,104 B2 | 11/2011 | Shahoian et al. |
| 8,063,322 B2 | 11/2011 | Katsurahira |
| 8,063,886 B2 | 11/2011 | Serban et al. |
| 8,072,439 B2 | 12/2011 | Hillis et al. |
| 8,072,440 B2 | 12/2011 | Pryor |
| 8,081,165 B2 | 12/2011 | Reiner |
| 8,091,437 B2 | 1/2012 | Stumpf |
| 8,094,130 B2 | 1/2012 | Griffin et al. |
| 8,095,278 B2 | 1/2012 | Schaaf et al. |
| 8,098,236 B2 | 1/2012 | Klein et al. |
| 8,113,065 B2 | 2/2012 | Ohsato et al. |
| 8,120,586 B2 | 2/2012 | Hsu et al. |
| 8,120,588 B2 | 2/2012 | Klinghult |
| 8,130,207 B2 | 3/2012 | Nurmi et al. |
| 8,134,535 B2 | 3/2012 | Choi et al. |
| 8,139,038 B2 | 3/2012 | Chueh et al. |
| 8,144,133 B2 | 3/2012 | Wang et al. |
| 8,149,211 B2 | 4/2012 | Hayakawa et al. |
| 8,151,210 B2 | 4/2012 | Nezu et al. |
| 8,154,528 B2 | 4/2012 | Chen et al. |
| 8,159,473 B2 | 4/2012 | Cheng et al. |
| 8,169,295 B2 | 5/2012 | Walkington |
| 8,171,431 B2 | 5/2012 | Grossman et al. |
| 8,184,093 B2 | 5/2012 | Tsuiki |
| 8,184,106 B2 | 5/2012 | Serban |
| 8,188,985 B2 | 5/2012 | Hillis et al. |
| 8,199,116 B2 | 6/2012 | Jeon et al. |
| 8,212,790 B2 | 7/2012 | Rimas-Ribikauskas et al. |
| 8,214,105 B2 | 7/2012 | Daly et al. |
| 8,228,305 B2 | 7/2012 | Pryor |
| 8,229,603 B2 | 7/2012 | Miyata et al. |
| 8,237,537 B2 | 8/2012 | Kurtz |
| 8,239,784 B2 | 8/2012 | Hotelling et al. |
| 8,243,035 B2 | 8/2012 | Abe et al. |
| 8,243,039 B2 | 8/2012 | Trachte |
| 8,253,699 B2 | 8/2012 | Son |
| 2001/0040551 A1 | 11/2001 | Yates et al. |
| 2002/0097229 A1 | 7/2002 | Rose et al. |
| 2002/0135457 A1 | 9/2002 | Sandbach et al. |
| 2002/0196131 A1* | 12/2002 | McCarthy et al. ......... 340/425.5 |
| 2003/0011576 A1 | 1/2003 | Sandbach et al. |
| 2003/0160808 A1 | 8/2003 | Foote et al. |
| 2004/0071471 A1 | 4/2004 | Baker et al. |
| 2004/0217331 A1 | 11/2004 | Lussey et al. |
| 2004/0252007 A1 | 12/2004 | Lussey et al. |
| 2005/0052426 A1 | 3/2005 | Hagermoser et al. |
| 2005/0052427 A1 | 3/2005 | Wu et al. |

(56) References Cited

U.S. PATENT DOCUMENTS

| | | |
|---|---|---|
| 2005/0055145 A1* | 3/2005 | Bober et al. .................. 701/45 |
| 2006/0028454 A1 | 2/2006 | Branton et al. |
| 2006/0202954 A1 | 9/2006 | Ho |
| 2006/0248478 A1 | 11/2006 | Liau |
| 2006/0255903 A1 | 11/2006 | Lussey et al. |
| 2007/0056493 A1 | 3/2007 | Burkitt et al. |
| 2007/0132736 A1 | 6/2007 | Crispin |
| 2007/0141939 A1 | 6/2007 | Sandbach et al. |
| 2007/0146313 A1 | 6/2007 | Newman et al. |
| 2007/0146342 A1 | 6/2007 | Medler et al. |
| 2007/0152959 A1 | 7/2007 | Peters |
| 2007/0176902 A1 | 8/2007 | Newman et al. |
| 2007/0229478 A1 | 10/2007 | Rosenberg et al. |
| 2007/0289859 A1 | 12/2007 | Sandbach et al. |
| 2008/0024438 A1 | 1/2008 | Collins et al. |
| 2008/0024454 A1 | 1/2008 | Everest |
| 2008/0030479 A1 | 2/2008 | Lowles et al. |
| 2008/0030482 A1 | 2/2008 | Elwell et al. |
| 2008/0036743 A1 | 2/2008 | Westerman et al. |
| 2008/0060854 A1 | 3/2008 | Perlin |
| 2008/0088577 A1 | 4/2008 | Lenneman et al. |
| 2008/0088600 A1 | 4/2008 | Prest et al. |
| 2008/0094367 A1 | 4/2008 | Van De Ven et al. |
| 2008/0170043 A1 | 7/2008 | Soss et al. |
| 2008/0211766 A1 | 9/2008 | Westerman et al. |
| 2008/0264183 A1 | 10/2008 | Graham et al. |
| 2008/0271933 A1 | 11/2008 | Morimoto |
| 2008/0278455 A1 | 11/2008 | Atkins et al. |
| 2008/0284743 A1 | 11/2008 | Hsu et al. |
| 2008/0289886 A1 | 11/2008 | Burkitt |
| 2008/0296073 A1 | 12/2008 | McDermid |
| 2008/0296140 A1 | 12/2008 | Yoshihara et al. |
| 2008/0302014 A1 | 12/2008 | Szczerba et al. |
| 2008/0303799 A1 | 12/2008 | Schwesig et al. |
| 2008/0303802 A1 | 12/2008 | Destura et al. |
| 2008/0309624 A1 | 12/2008 | Hotelling |
| 2008/0309626 A1 | 12/2008 | Westerman et al. |
| 2008/0316181 A1 | 12/2008 | Nurmi |
| 2009/0002325 A1 | 1/2009 | Jha et al. |
| 2009/0009482 A1 | 1/2009 | McDermid |
| 2009/0020343 A1 | 1/2009 | Rothkopf et al. |
| 2009/0027353 A1 | 1/2009 | Im et al. |
| 2009/0061823 A1 | 3/2009 | Chu |
| 2009/0095541 A1 | 4/2009 | Lee |
| 2009/0128507 A1 | 5/2009 | Hoshino et al. |
| 2009/0132128 A1* | 5/2009 | Marriott et al. .................. 701/45 |
| 2009/0140985 A1 | 6/2009 | Liu |
| 2009/0140989 A1 | 6/2009 | Ahlgren |
| 2009/0140994 A1 | 6/2009 | Tanaka et al. |
| 2009/0153522 A1 | 6/2009 | Chou |
| 2009/0160529 A1 | 6/2009 | Lamborghini et al. |
| 2009/0160793 A1 | 6/2009 | Rekimoto |
| 2009/0167722 A1 | 7/2009 | Villain |
| 2009/0184921 A1 | 7/2009 | Scott et al. |
| 2009/0201261 A1 | 8/2009 | Day |
| 2009/0237374 A1 | 9/2009 | Li et al. |
| 2009/0244017 A1 | 10/2009 | Pala et al. |
| 2009/0249191 A1 | 10/2009 | Leoutsarakos et al. |
| 2009/0256807 A1 | 10/2009 | Nurmi |
| 2009/0256817 A1 | 10/2009 | Perlin et al. |
| 2009/0258677 A1 | 10/2009 | Ellis et al. |
| 2009/0267921 A1 | 10/2009 | Pryor |
| 2009/0273573 A1 | 11/2009 | Hotelling |
| 2009/0279811 A1 | 11/2009 | Kilburn et al. |
| 2009/0309616 A1 | 12/2009 | Klinghult et al. |
| 2009/0322695 A1 | 12/2009 | Cho et al. |
| 2009/0327977 A1 | 12/2009 | Bachfischer et al. |
| 2010/0013774 A1 | 1/2010 | Chen et al. |
| 2010/0020030 A1 | 1/2010 | Kim et al. |
| 2010/0024573 A1 | 2/2010 | Daverman et al. |
| 2010/0026640 A1 | 2/2010 | Kim et al. |
| 2010/0039393 A1 | 2/2010 | Pratt et al. |
| 2010/0045624 A1 | 2/2010 | Hisatsugu et al. |
| 2010/0053078 A1 | 3/2010 | Kim et al. |
| 2010/0053116 A1 | 3/2010 | Daverman et al. |
| 2010/0062148 A1 | 3/2010 | Lussey et al. |
| 2010/0066697 A1 | 3/2010 | Jacomet et al. |
| 2010/0079391 A1 | 4/2010 | Joung |
| 2010/0079395 A1 | 4/2010 | Kim et al. |
| 2010/0085169 A1 | 4/2010 | Poupyrev et al. |
| 2010/0090973 A1 | 4/2010 | Algreatly |
| 2010/0097335 A1 | 4/2010 | Jung et al. |
| 2010/0097336 A1 | 4/2010 | Gomes et al. |
| 2010/0099394 A1 | 4/2010 | Hainzl |
| 2010/0102922 A1 | 4/2010 | Walkington |
| 2010/0110018 A1 | 5/2010 | Faubert et al. |
| 2010/0110026 A1 | 5/2010 | Kis et al. |
| 2010/0117978 A1 | 5/2010 | Shirado |
| 2010/0123667 A1 | 5/2010 | Kim et al. |
| 2010/0123678 A1 | 5/2010 | Kim et al. |
| 2010/0123686 A1 | 5/2010 | Klinghult et al. |
| 2010/0126840 A1 | 5/2010 | Walkington |
| 2010/0127975 A1 | 5/2010 | Jensen |
| 2010/0141410 A1 | 6/2010 | Aono et al. |
| 2010/0153879 A1 | 6/2010 | Rimas-Ribikauskas et al. |
| 2010/0156818 A1 | 6/2010 | Burrough et al. |
| 2010/0171713 A1 | 7/2010 | Kwok et al. |
| 2010/0214239 A1 | 8/2010 | Wu |
| 2010/0222972 A1 | 9/2010 | Hustyi |
| 2010/0231540 A1 | 9/2010 | Cruz-Hernandez et al. |
| 2010/0250071 A1 | 9/2010 | Pala et al. |
| 2010/0253645 A1 | 10/2010 | Bolender |
| 2010/0265170 A1 | 10/2010 | Norieda |
| 2010/0271325 A1 | 10/2010 | Conte et al. |
| 2010/0277438 A1 | 11/2010 | Kawashima et al. |
| 2010/0283749 A1 | 11/2010 | Walkington |
| 2010/0308844 A1 | 12/2010 | Day et al. |
| 2010/0315267 A1 | 12/2010 | Chung et al. |
| 2010/0315349 A1 | 12/2010 | Choi |
| 2011/0006980 A1 | 1/2011 | Taniguchi et al. |
| 2011/0007023 A1 | 1/2011 | Abrahamsson et al. |
| 2011/0021251 A1 | 1/2011 | Lindén |
| 2011/0022393 A1 | 1/2011 | Wäller et al. |
| 2011/0030502 A1 | 2/2011 | Lathrop |
| 2011/0032203 A1 | 2/2011 | Pryor |
| 2011/0043468 A1 | 2/2011 | Lathrop et al. |
| 2011/0043491 A1 | 2/2011 | Oh |
| 2011/0050588 A1 | 3/2011 | Li et al. |
| 2011/0050589 A1 | 3/2011 | Yan et al. |
| 2011/0050591 A1 | 3/2011 | Kim et al. |
| 2011/0050629 A1 | 3/2011 | Homma et al. |
| 2011/0057899 A1 | 3/2011 | Sleeman et al. |
| 2011/0063248 A1 | 3/2011 | Yoon |
| 2011/0069024 A1 | 3/2011 | Kim |
| 2011/0074724 A1 | 3/2011 | Pryor |
| 2011/0082627 A1 | 4/2011 | Small et al. |
| 2011/0087983 A1 | 4/2011 | Shim |
| 2011/0107272 A1 | 5/2011 | Aguilar |
| 2011/0109578 A1 | 5/2011 | Wäller et al. |
| 2011/0115736 A1 | 5/2011 | Joguet et al. |
| 2011/0128164 A1 | 6/2011 | Kang et al. |
| 2011/0128235 A1 | 6/2011 | Rogers et al. |
| 2011/0128250 A1 | 6/2011 | Murphy et al. |
| 2011/0141052 A1 | 6/2011 | Bernstein et al. |
| 2011/0141053 A1 | 6/2011 | Bulea et al. |
| 2011/0175754 A1 | 7/2011 | Karpinsky |
| 2011/0175844 A1 | 7/2011 | Berggren |
| 2011/0175845 A1 | 7/2011 | Honda et al. |
| 2011/0181430 A1 | 7/2011 | Hu et al. |
| 2011/0181546 A1 | 7/2011 | Joguet et al. |
| 2011/0187674 A1 | 8/2011 | Baker et al. |
| 2011/0193813 A1 | 8/2011 | Gralewski et al. |
| 2011/0205151 A1 | 8/2011 | Newton et al. |
| 2011/0205162 A1 | 8/2011 | Wäller et al. |
| 2011/0205182 A1 | 8/2011 | Miyazawa et al. |
| 2011/0210926 A1 | 9/2011 | Pasquero et al. |
| 2011/0221564 A1 | 9/2011 | Deppiesse et al. |
| 2011/0221684 A1 | 9/2011 | Rydenhag |
| 2011/0221693 A1 | 9/2011 | Miyazaki |
| 2011/0221694 A1 | 9/2011 | Karaoguz et al. |
| 2011/0227870 A1 | 9/2011 | Kim |
| 2011/0227872 A1 | 9/2011 | Huska et al. |
| 2011/0239110 A1 | 9/2011 | Garrett et al. |
| 2011/0242029 A1 | 10/2011 | Kasahara et al. |

(56) References Cited

U.S. PATENT DOCUMENTS

| | | |
|---|---|---|
| 2011/0248942 A1 | 10/2011 | Yana et al. |
| 2011/0253948 A1 | 10/2011 | Lussey et al. |
| 2011/0260965 A1 | 10/2011 | Kim et al. |
| 2011/0267294 A1 | 11/2011 | Kildal |
| 2011/0273394 A1 | 11/2011 | Young et al. |
| 2011/0275412 A1 | 11/2011 | Khawand |
| 2011/0278078 A1 | 11/2011 | Schediwy et al. |
| 2011/0304559 A1 | 12/2011 | Pasquero |
| 2011/0304581 A1 | 12/2011 | An et al. |
| 2011/0316811 A1 | 12/2011 | Kitagawa |
| 2012/0001870 A1 | 1/2012 | Lee et al. |
| 2012/0019448 A1 | 1/2012 | Pitkanen et al. |
| 2012/0019463 A1 | 1/2012 | Ng et al. |
| 2012/0026124 A1 | 2/2012 | Li et al. |
| 2012/0032899 A1 | 2/2012 | Waeller et al. |
| 2012/0032907 A1 | 2/2012 | Koizumi et al. |
| 2012/0032915 A1 | 2/2012 | Wittorf |
| 2012/0044169 A1 | 2/2012 | Enami |
| 2012/0044172 A1 | 2/2012 | Ohki et al. |
| 2012/0050159 A1 | 3/2012 | Yu et al. |
| 2012/0050208 A1 | 3/2012 | Dietz |
| 2012/0056818 A1 | 3/2012 | Shafi et al. |
| 2012/0056837 A1 | 3/2012 | Park et al. |
| 2012/0062603 A1 | 3/2012 | Mizunuma et al. |
| 2012/0068946 A1 | 3/2012 | Tang et al. |
| 2012/0068965 A1 | 3/2012 | Wada et al. |
| 2012/0068969 A1 | 3/2012 | Bogana et al. |
| 2012/0081327 A1 | 4/2012 | Heubel et al. |
| 2012/0086659 A1 | 4/2012 | Perlin et al. |
| 2012/0086670 A1 | 4/2012 | Teil et al. |
| 2012/0092250 A1 | 4/2012 | Hadas et al. |
| 2012/0092279 A1 | 4/2012 | Martin |
| 2012/0092294 A1 | 4/2012 | Ganapathi et al. |
| 2012/0092299 A1 | 4/2012 | Harada et al. |
| 2012/0092324 A1 | 4/2012 | Buchan et al. |
| 2012/0105358 A1 | 5/2012 | Momeyer et al. |
| 2012/0105367 A1 | 5/2012 | Son et al. |
| 2012/0113028 A1 | 5/2012 | Marsden et al. |
| 2012/0113054 A1 | 5/2012 | Hashimoto et al. |
| 2012/0113061 A1 | 5/2012 | Ikeda |
| 2012/0120009 A1 | 5/2012 | Lussey et al. |
| 2012/0127088 A1 | 5/2012 | Pance et al. |
| 2012/0127107 A1 | 5/2012 | Miyashita et al. |
| 2012/0127179 A1 | 5/2012 | Aspelin |
| 2012/0139864 A1 | 6/2012 | Sleeman et al. |
| 2012/0146945 A1 | 6/2012 | Miyazawa et al. |
| 2012/0147052 A1 | 6/2012 | Homma et al. |
| 2012/0154315 A1 | 6/2012 | Aono |
| 2012/0154316 A1 | 6/2012 | Kono |
| 2012/0154317 A1 | 6/2012 | Aono |
| 2012/0154318 A1 | 6/2012 | Aono |
| 2012/0154328 A1 | 6/2012 | Kono |
| 2012/0154329 A1 | 6/2012 | Shinozaki |
| 2012/0154330 A1 | 6/2012 | Shimizu |
| 2012/0162122 A1 | 6/2012 | Geaghan |
| 2012/0169609 A1 | 7/2012 | Britton |
| 2012/0169617 A1 | 7/2012 | Mäenpää |
| 2012/0169635 A1 | 7/2012 | Liu |
| 2012/0169636 A1 | 7/2012 | Liu |
| 2012/0188181 A1 | 7/2012 | Ha et al. |
| 2012/0194460 A1 | 8/2012 | Kuwabara et al. |
| 2012/0194466 A1 | 8/2012 | Posamentier |
| 2012/0204653 A1 | 8/2012 | August et al. |
| 2012/0205165 A1 | 8/2012 | Strittmatter et al. |
| 2012/0206393 A1 | 8/2012 | Hillis et al. |
| 2012/0218212 A1 | 8/2012 | Yu et al. |

FOREIGN PATENT DOCUMENTS

| | | |
|---|---|---|
| DE | 60130983 T2 | 7/2008 |
| EP | 1887595 A1 | 2/2008 |
| GB | 2423646 A | 8/2006 |
| GB | 2445505 A | 7/2008 |
| GB | 2448893 A | 11/2008 |
| GB | 2450587 A | 12/2008 |
| GB | 2452714 A | 3/2009 |
| GB | 2454619 A | 5/2009 |
| GB | 2462920 A | 3/2010 |
| GB | 2465077 A | 5/2010 |
| GB | 2465713 A | 6/2010 |
| GB | 2468870 A | 9/2010 |
| GB | 2437997 B | 7/2011 |
| GB | 2443658 B | 9/2011 |
| WO | 9803193 A1 | 7/1998 |
| WO | 9938173 A1 | 7/1999 |
| WO | 0079546 A1 | 12/2000 |
| WO | 0188935 A1 | 11/2001 |
| WO | 02099822 A2 | 12/2002 |
| WO | 2005029514 A1 | 3/2005 |
| WO | 2006016138 A1 | 2/2006 |
| WO | 2008135787 A1 | 11/2008 |
| WO | 2009104313 A2 | 3/2009 |
| WO | 2010023449 A1 | 3/2010 |
| WO | 2010109186 A2 | 9/2010 |

OTHER PUBLICATIONS

Official U.S. Office Action, dated May 8, 2013, in U.S. Appl. No. 13/074,739.
Copending U.S. Appl. No. 13/076,226, filed Mar. 30, 2011.
Official U.S. Office Action, dated Mar. 11, 2013, in U.S. Appl. No. 13/076,226.
Teulings, A.M.G.L., "Development of a numerical model for the US-DoT Side Impact Dummy," Technische Universiteit Eindhoven, Department of Mechanical Engineering, WFW-report DOT.2001.42, 2001, 63 pages.

* cited by examiner

OCCUPANT SENSING SYSTEM

CROSS-REFERENCE TO RELATED PATENT APPLICATIONS

This application claims priority from Provisional Application U.S. Application 61/319,621, filed Mar. 31, 2010, incorporated herein by reference in its entirety.

BACKGROUND

The present disclosure relates generally to the field of occupant classification systems and occupant position detection systems. More specifically, the disclosure relates to resistive and capacitive sensing systems and sensing methods for a vehicle seat.

One of the problems with current weight based occupant classification systems in vehicles is their inability to capture the entire occupant weight due to offloading. Offloading is the occurrence of alternate paths of occupant weight transfer. For example, offloading occurs when the occupant rests their feet close to the base of the seat removing the weight of their legs from the seat, transferring leg weight directly to the floor of the vehicle instead of the weight sensing devices.

There or many other forms of occupant offloading including but not limited to head and arm offloading while the occupant is leaning against the center console and leaning against the vehicle door. The complete weight of the head, arms, and legs is not transferred through the weight sensors if the occupant is leaning forward.

Vehicle manufacturers are aware that weight based systems do not capture offloading and therefore do not always capture the full weight of the occupant. This inaccuracy is one input in determining occupant classification threshold strategies.

There are occupant classification systems that measure the weight of a person utilizing various technologies like strain gauges, capacitive mats, hall effect sensors, and pressure sensing materials. The current designs also do not capture both the occupant weight and position. Current occupant position detection systems utilize capacitive mat technology, which has several limitations and is not used as a single system with occupant classification systems. The current occupant classification designs also are only used for passenger seats.

SUMMARY

One exemplary embodiment relates to an occupant sensing system for a vehicle. The occupant sensing system includes a pressure sensitive material installed in one or more pressure sensing zones in or around at least one vehicle seat. The pressure sensitive material of each zone is configured to provide an electrical signal to a controller when pressure is applied. The controller determines at least one of occupant presence, position, and classification based on the electrical signal. The pressure sensitive material has at least one of a variable resistance and a variable capacitance based on the amount or type of pressure that is applied to the material. The at least one of a variable resistance and a variable capacitance changes characteristics of the electrical signal.

Another exemplary embodiment relates to an occupant classification system for a vehicle. The system includes an array of sensors installed in one or more pressure sensing zones in or around at least one vehicle seat. Each sensor includes a pressure sensitive material configured to provide an electrical signal to a controller when pressure is applied. The controller determines at least one of occupant position and classification based on the electrical signal. The pressure sensitive material has at least one of a variable resistance and a variable capacitance based on the amount or type of pressure that is applied to the material. The at least one of a variable resistance and a variable capacitance changes characteristics of the electrical signal Another exemplary embodiment relates to an occupant detection system for a vehicle. The system includes a sensor installed in one or more pressure sensing zones in or around at least one vehicle seat. The sensor includes a pressure sensitive material configured to provide an electrical signal to a controller when pressure is applied. The controller determines occupant presence based on the electrical signal. The pressure sensitive material has at least one of a variable resistance and a variable capacitance based on the amount or type of pressure that is applied to the material. The at least one of a variable resistance and a variable capacitance changes characteristics of the electrical signal.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description and the accompanying exemplary embodiments shown in the drawings, which are briefly described below.

DETAILED DESCRIPTION

According to various exemplary embodiments, an occupant classification and position detection system may capture or identify offloading. The system more accurately measures occupant weight by capturing all or most of the occupant true weight, removing the reliance currently placed on statistical prediction algorithms. By utilizing a pressure sensitive material located in multiple locations in the vehicle, the weight of a person weight may be more accurately captured and the location of the person within the seat may be identified. The weight and location of the person may be identified for the driver and/or the passenger. Such identification may be used as parameters in the vehicle for determining a crash safety strategy.

Figure 1:
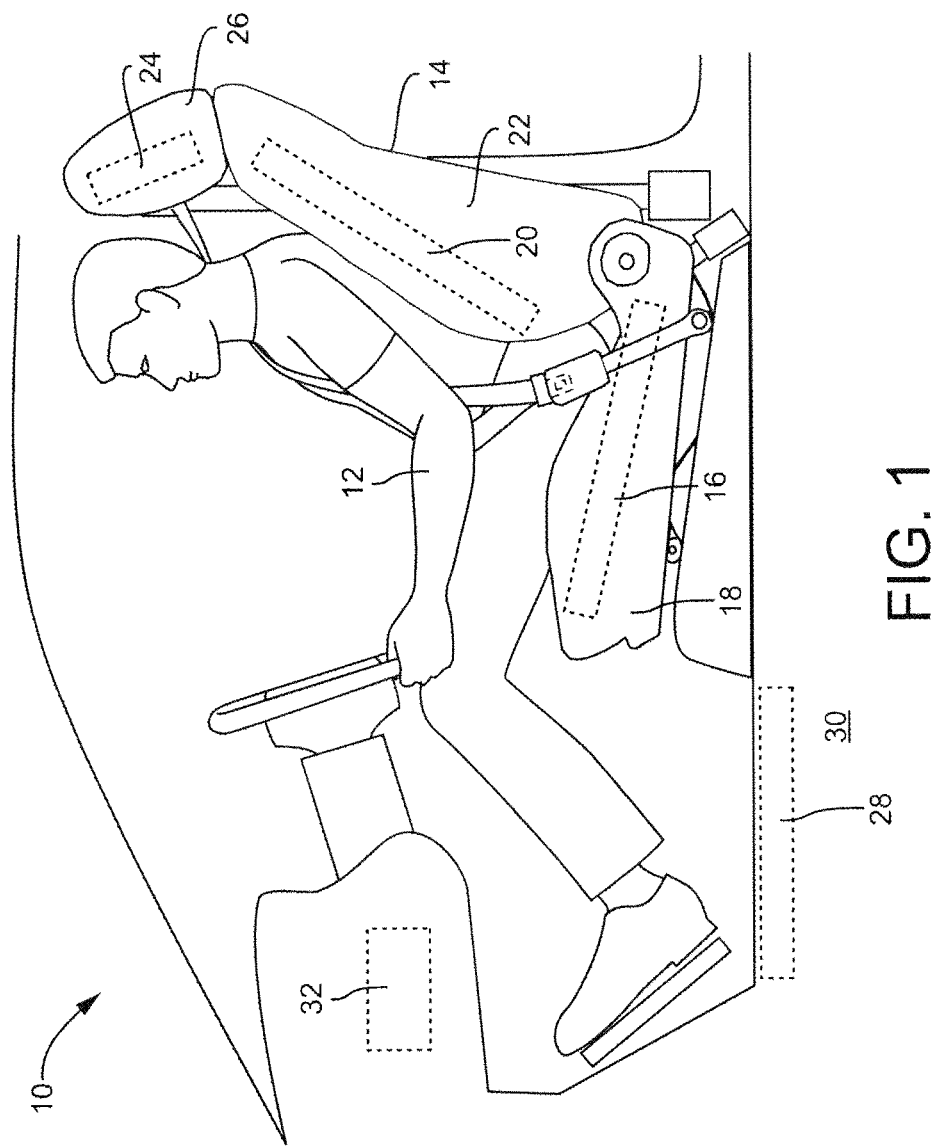
FIG. 1 is a schematic diagram of a vehicle and occupant sensing system, according to an exemplary embodiment.

Referring to FIG. 1, a vehicle 10 is shown with an occupant 12 in a seat 14 of the vehicle 10, according to an exemplary embodiment. The vehicle includes an occupant classification system for determining a weight and position of the occupant 12. The occupant classification system includes a pressure sensitive material 16 located in a seat base 18, a pressure sensitive material 20 located in a seat back 22, a pressure sensitive material 24 located in a headrest 26, and a pressure sensitive material 28 located in a vehicle floor 30. In other exemplary embodiments, the occupant classification system may also include pressure sensitive material located in an armrest, a center console, floor mats, mats placed on the seat 14, or other areas of the vehicle that an occupant may make contact with. Each portion of pressure sensitive material may make up a pressure sensing zone. Based on the amount of pressure placed on each of the pressure sensitive material portions, a controller 32 may determine the weight and position of a vehicle occupant.

Figure 2:
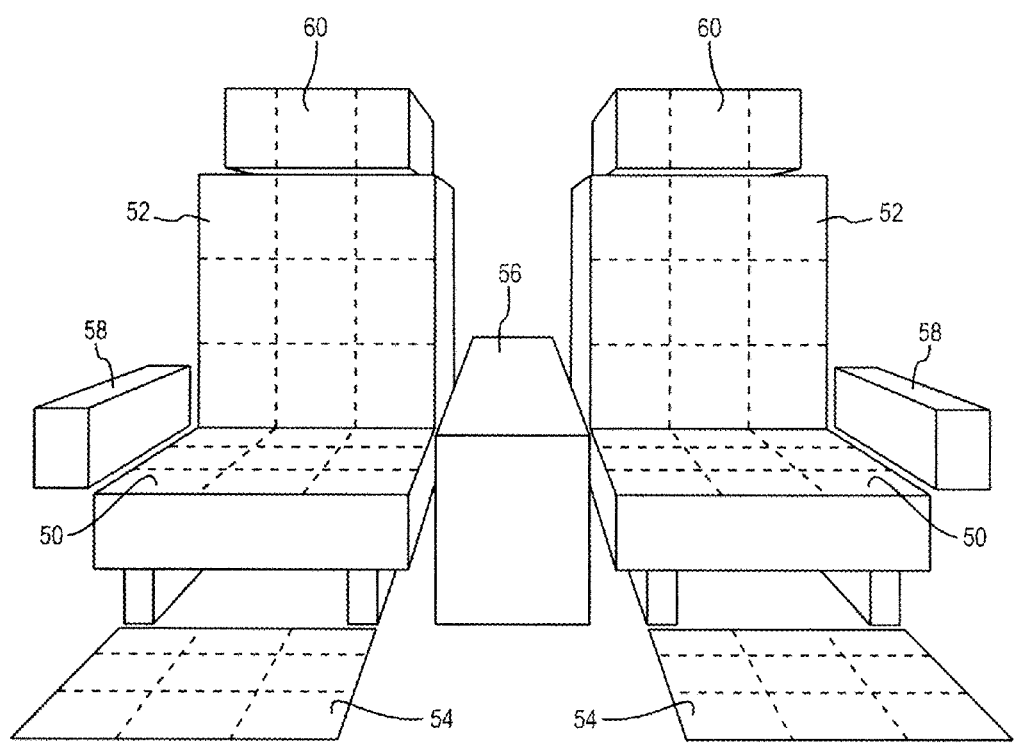
FIG. 2 is a schematic diagram of a pressure sensing system, according to an exemplary embodiment.

Referring also to FIG. 2, an occupant classification system 50 includes one or more pressure sensing zones that supply a known electrical response to the controller 32 based on physical pressure, according to an exemplary embodiment. The pressure sensing zones may be installed for both a passenger and a driver of the vehicle. Outside of the common seat base zone 52 and/or seatback zone 54 there may be other zones located throughout the vehicle 10. The pressure sensing zones include, but are not limited to, a zone 56 located at the occupant's feet to detect leg offloading and position, a zone 58 located at the center console to detect arm and head offloading and position, a zone 60 located at the arm rest on the door to detect arm and head offloading and position, and a zone 62 located at the head rest to determine head position.

Each zone may be subdivided into one or more sub-zones to more accurately capture the occupant's position. As illustrated, the floor zone 56, seat base zone 52, seatback zone 54, and head rest zone 62 may each be subdivided into nine sub-zones to better detect position while the center console zone 58 may be subdivided into two sub-zones for each of the passenger and driver. According to other exemplary embodiments, each zone may be subdivided into more or fewer than the illustrated number of sub-zones.

The controller 32 of the vehicle 10 may use inputs from the sensing zones located in and around the driver seat to determine if the driver has fallen asleep, had a medical emergency, is seated in an unsafe manner, etc. The controller 32 may use inputs from the sensing zones located in and around the passenger seat to determine if the passenger is seated in an unsafe manner, weighs enough for airbag deployment, etc. The controller 32 may use the inputs to determine the size/weight of the driver and/or passenger to tailor the safety devices (e.g., driver airbag, passenger airbag, side airbag, seatbelt, etc.) to the occupant in case of a crash event.

In some exemplary embodiments, the controller 32 may use inputs from the sensing zones located in and around the driver and/or passenger seat to more accurately weight the occupant. For example, the sensed weight in each zone for the passenger or driver may be added together by the controller 32 to calculate a more accurate weight or size of the occupant.

In other exemplary embodiments, the controller 32 may use inputs from the sensing zones located in and around the driver and/or passenger seat to determine if the occupant is being correctly weighed or if offloading is occurring. For example, if weight is being applied to the armrest, center console, headrest, and/or floor zones instead of to the seat base or seatback zones. If the controller 32 determines that offloading is occurring, the controller 32 may adjust the weight based on pressure applied to the armrest, center console, headrest, and/or floor zones. Alternatively or additionally, if the controller 32 determines that offloading is occurring, the controller 32 may adjust the weight based on an amount and location of pressure applied to the seat base or seatback zones.

According to some exemplary embodiments, the occupant sensing system may be used in parallel with a conventional occupant sensing system to improve measurement of the conventional system. For example, the occupant sensing system may be used with a surface based (e.g., A-surface) conventional system or with a structure based (e.g., frame) conventional system.

According to other exemplary embodiments, the occupant sensing system may be used to drive active and/or passive restraint systems. The pressure detected by the occupant sensing system may be used by controller 32 to determine that a crash event is occurring or is about to occur. In active systems, the pressure detected by the occupant sensing system may be used by the controller 32 to determine whether to actuate seatbelt pretensioners. In passive systems, the pressure detected by the occupant sensing system may be used by the controller 32 to deploy the airbag.

In various exemplary embodiments where a pressure sensitive material is used in the seat base and is located below the seat belt anchor point, then no belt pressure sensor may be required. In other exemplary embodiments where a pressure sensitive material is located in the seat base and above the seat belt anchor point, a belt tensioning system may be used to cancel influence of belt tension to registered occupant weight.

Figure 3:
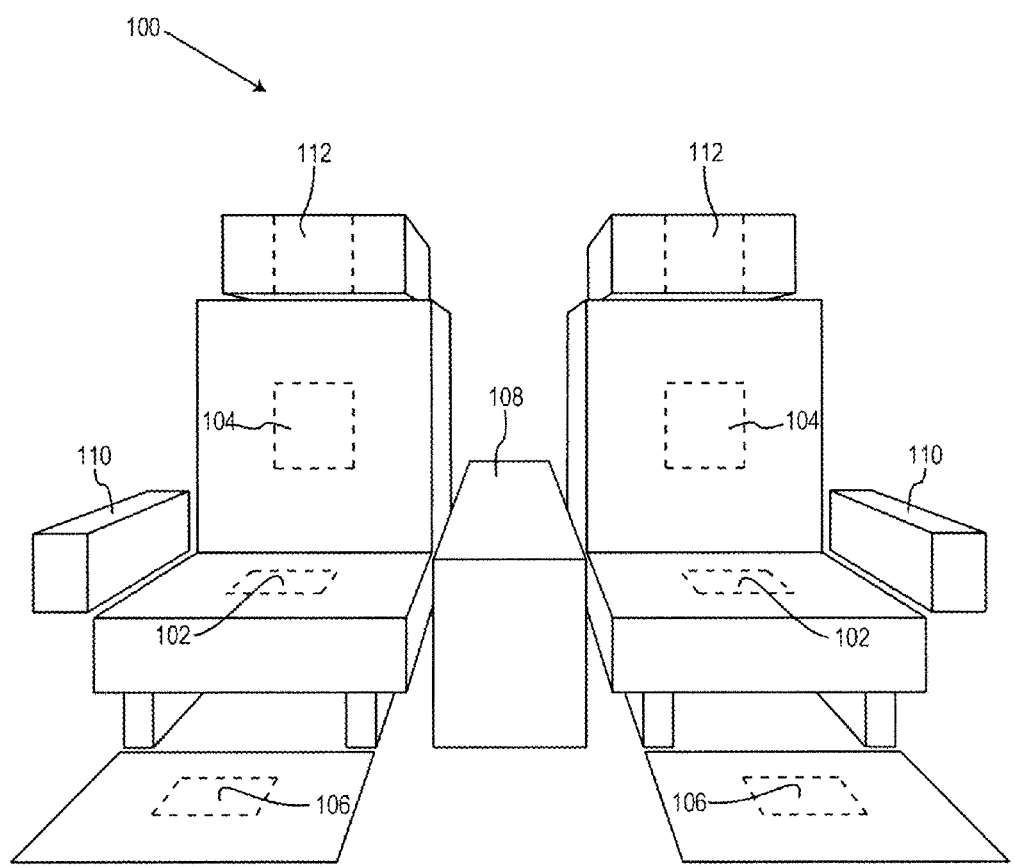
FIG. 3 is a schematic diagram of a pressure sensing system, according to another exemplary embodiment.

Referring to FIG. 3, an occupant detection system 100 includes one or more pressure sensing zones that supply a known electrical response to the controller 32 based on physical pressure, according to an exemplary embodiment. The pressure sensing zones may be installed for rear or passenger seats of the vehicle. Outside of the common seat base zone 102 and/or seatback zone 104 there may be other zones located throughout the vehicle 10. The pressure sensing zones include, but are not limited to, a zone 106 located at the occupant's feet to detect leg presence, a zone 108 located at the center console to detect arm presence, a zone 110 located at the arm rest on the door to detect arm presence, and a zone 112 located at the head rest to determine head presence.

One or more of the illustrated zones may have a more simple pressure sensing sheet (e.g., having a single sensor, having only two lead wires, etc.) than the zones of FIG. 2 such that the sensing sheet is configured to detect occupant presence rather than occupant position or classification. For example, rear seats of the vehicle may include a sensor having a pressure sensitive material in one or more zones to detect whether an occupant is present at a seat location. In one exemplary embodiment, if any one of the pressure sensors for a seat are triggered, the controller (e.g., controller 32) may detect the presence of an occupant. In other exemplary embodiments, occupant detection may be based on a predetermined number of the pressure sensors for a seat being triggered. Such information may be used by the controller in conjunction with seatbelt sensors to alert the driver whether passengers are wearing their seatbelts. An alert is not provided for seat positions in which an occupant is not detected. In some exemplary embodiments, the driver may be able to override alerts to allow the driver to ignore the indicator in situations involving pets and other materials that may actuate the sensors.

Referring to FIGS. 2 and 3, the controller may read the values from sensors using algorithms that involve summing not only the number of sensing elements that are seeing force but also the amount of force each one is seeing. The controller may read the values from the sensors using algorithms that involve the precise location of each sensing element that was detecting force. For a simpler occupant detection system, the sensor layout may be a simplified version of the sensor layout of a classification system. The controller may detect readings from any of the sensing elements or from a single sensing element.

In other exemplary embodiments, the controller may read the values from sensors located within the seat structure and below the seatbelt anchor point using standard zero point and sensitivity values to translate the force values to proportional changes in output voltage or current. Sensors located within the seat structure and above the seatbelt anchor point may require the addition of a belt tension system. In order to capture the total amount of weight being applied to the seat using sensors located in the seat structure, forces in both compression and tension may be measured. There are situations where an occupant's position causes compression in the rear of the seat and tension in the front of the seat. It is the sum of the forces that provides a more accurate measurement of the true weight being applied to the seat. The ability to measure forces in both directions may significantly complicate the construction of the sensor. In one exemplary embodiment, a single sensing element located in the direct force path may be pre-loaded. That is, the sensor is under a force when the seat is empty. Movement in the compression direction is detected as additional force and movement in the tension direction is detected as reduced pre-load. It is noted that in various other exemplary embodiments, any combination of surface-based sensors and sensors located within the seat or vehicle structure may be used.

Figure 4:
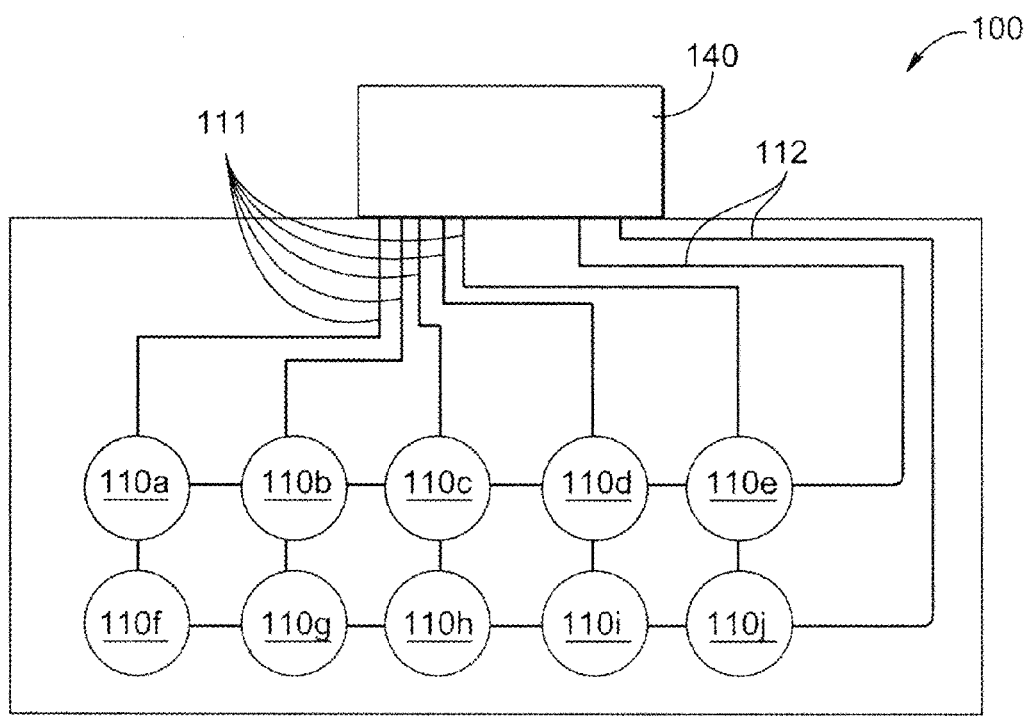
FIG. 4 is a top view of a sensor sheet according to an exemplary embodiment.
Figure 5:
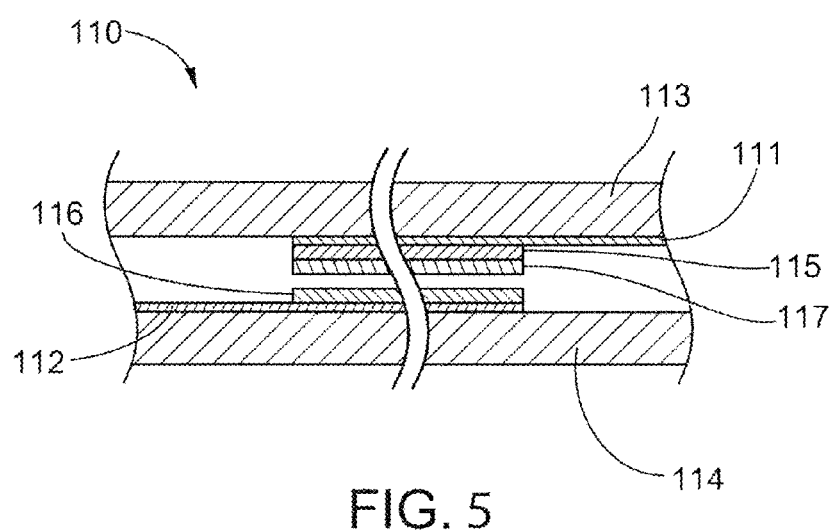
FIG. 5 is sectional view of a sensor according to an exemplary embodiment.

With reference to FIGS. 4-5, a sensor sheet 100 (e.g., placed in any of the zones illustrated in FIGS. 2-3) generally includes one or more sensors 110. The sensors 110 are electrically coupled by input and output conductors 111, 112 to a controller or measuring device (e.g., controller 32), which is configured to send and receive electrical signals to and from the sensors 110.

Figure 6:
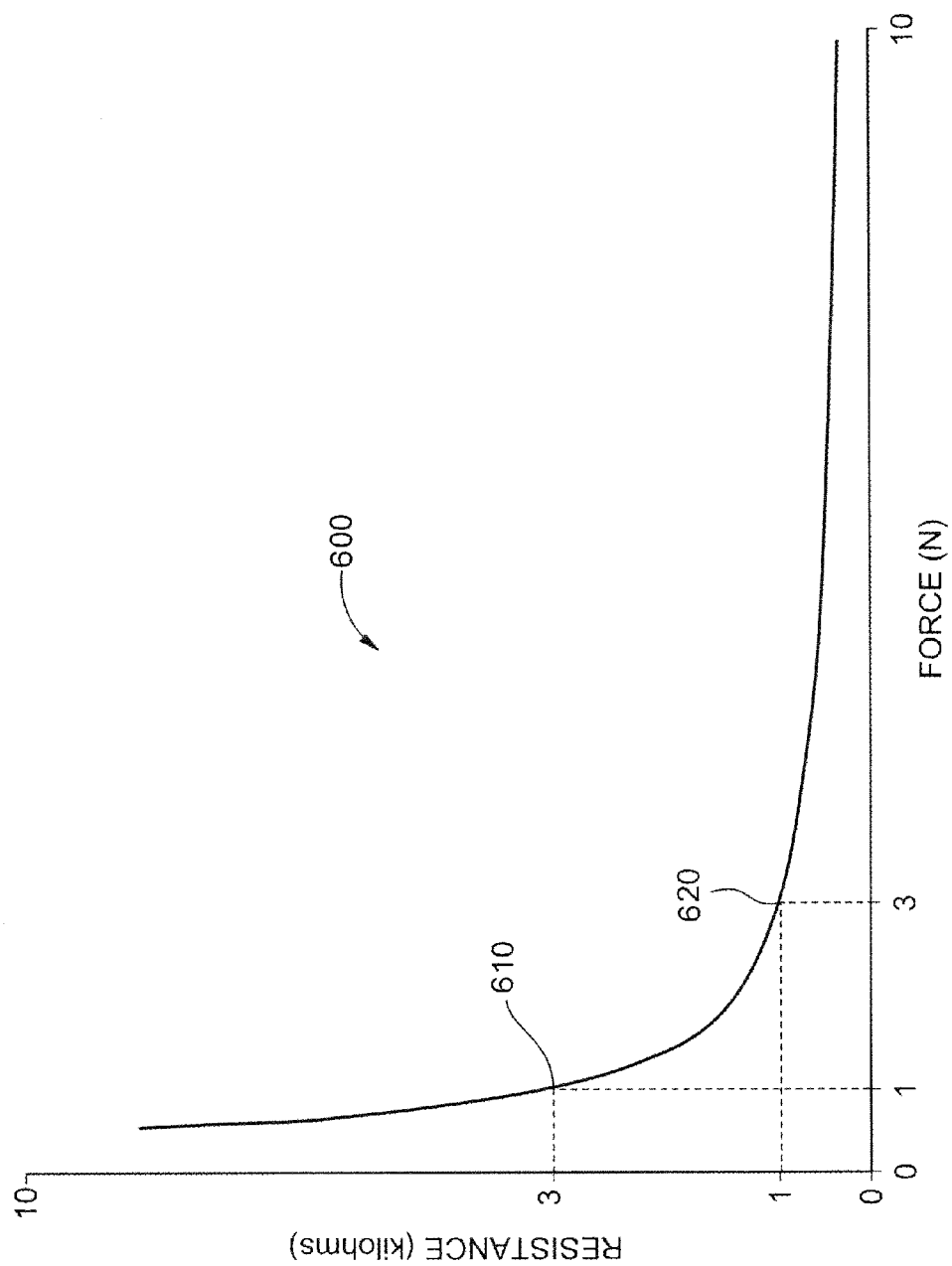
FIG. 6 is a graph of theoretical resistance characteristics of a sensor according to an exemplary embodiment.

As shown in FIG. 6, the sensors 110 generally include sheets of carrier material 113, 114, conductors 111, 112, electrodes 115, 116, and a pressure sensitive material 117 configured in a generally symmetric, layered relationship (e.g., a carrier sheet, conductor, and electrode disposed on each side of the pressure sensitive material). As discussed in further detail below, the carrier sheets 113, 114, conductors 111, 112, electrodes 115, 116, and pressure sensitive material 117 may be selectively configured to change conductive or electrical characteristics of the sensors 110 according to the forces expected during a dynamic impact event.

The first and second carrier sheets 113, 114 may, for example, be configured to be the covering or base material of the respective zone surface. Each of the carrier sheets 113, 114 may be made from a semi-rigid, sheet material. For example, each of the carrier sheets 113, 114 may be a polyethylene terephthalate (PET) sheet, having a thickness of approximately 50 microns. According to other exemplary embodiments, the carrier sheets 113, 114 may be made from other materials (e.g., polycarbonate, polyamide, other extruded plastic materials, leather, other plastic, fabric, wood, multiple materials within one sheet, different materials for each sheet, etc.) or have other thicknesses (e.g., between approximately 25 microns and 250 microns, varying thickness for one sheet, different thicknesses for different sheets, etc.).

Each of the conductors 111, 112 is configured to conduct electrical signals between the one of the sensors 110 and the controller or measuring device. The conductors are made from a conductive material, such as silver (Ag). The conductors 111, 112 may be coupled, deposited, or applied to the carrier sheets 113, 114 through a printing process, such as two- or three-dimensional ink jet or screen printing, vapor deposition, or conventional printed circuit techniques, such etching, photo-engraving, or milling. The input conductor 111 may, for example, be coupled to an interior surface of the first carrier sheet 113, and the output conductor 112 may, for example, be coupled to an interior surface of the second carrier sheet 114. The conductors 111, 112 have a finished thickness of less than approximately 25 microns. According to other exemplary embodiments, the conductors 111, 112 may be made from other materials (e.g., copper (Cu) or other conductive materials, a combination thereof, etc.), may be made from different materials than each other, may have a different finished thickness (e.g., more or less than approximately 25 microns, varying thickness for each conductor, different thickness or different conductors, etc.), or be provided by other methods.

Each of the electrodes 115, 116 is configured to efficiently conduct electrical signals to or from the pressure sensitive material 117. The electrodes 115, 116 are made from a conductive material, such as carbon (C). The electrodes 115, 116 may be coupled, deposited, or applied to the conductors 111, 112, and/or carrier sheets 113, 114, respectively, by a printing process, such as two or three-dimensional ink jet or screen printing, vapor deposition, or conventional printed circuit techniques, such etching, photo-engraving, or milling. The electrodes 115, 116 may have a finished thickness of less than approximately 25 microns. According to other exemplary embodiments, the electrodes 115, 116 may be made from other materials, may be made from different materials than each other, may have a different finished thickness (e.g., approximately 25 microns or more, varying thickness for each electrodes, different thickness than other electrodes, etc.), be provided by different methods, or be provided in a different order (e.g., one of the electrodes may be applied to the pressure sensitive material 117).

The pressure sensitive material 117 is configured to change resistance or conductive/electrical characteristics in response to force or pressure acting thereupon. More particularly, the pressure sensitive material 117 behaves substantially as an isolator when no force or pressure is present and decreases in resistance as more force or pressure is present. Between low and high forces, the pressure sensitive material 117 responds to force or pressure in a predictable manner, decreasing in resistance with increasing force. These characteristics are shown in the graph 600 of FIG. 6, which depicts the Resistance v. Force characteristics of a sensor 110 as described herein. FIG. 6 is discussed in further detail below.

The pressure sensitive material 117 may, for example, be a carbon nanotube conductive polymer. The pressure sensitive material 117 is applied to one of the electrodes 115, 116 by a printing process, such as two- or three-dimensional ink jet or screen printing, vapor deposition, or conventional printed circuit techniques, such etching, photo-engraving, or milling. As pressure sensitive materials 117 with smaller particle sizes are used, such as that of graphene, the pressure sensitive material 117 may also be applied through conventional printed circuit techniques, such as vapor deposition.

According to other exemplary embodiments, the pressure sensitive material is a quantum tunneling composite (QTC), which is a variable resistance pressure sensitive material that employs Fowler-Nordheim tunneling. QTC is a material commercially made by Peratech (www.peratech.com), of Brompton-on-Swale, UK. The QTC material in the sensors 110 may act as an insulator when zero pressure or zero force is applied, since the conductive particles may be too far apart to conduct, but as pressure (or force) is applied, the conductive particles move closer to other conductive particles, so that electrons can pass through the insulator layer changing the insulator layer changing the resistance of the sensor 110. Thus, the resistance of the QTC in the sensors 110 is a function of the force or pressure acting upon the sensor 110.

The carrier sheets 113, 114 are coupled together to form the sensor sheet 100 after the conductors 111, 112, electrodes 115, 116, and pressure sensitive material 117 are deposited thereon. The carrier sheets 113 may, for example, be laminated together, such that the conductors 111, 112, electrodes 115, 116, and pressure sensitive material 117 are in proper alignment. The lamination process may for example be a conventional process using heat and pressure. Adhesives may also be used. The total thickness of the sensor sheet 100 and/or sensors 110 may be approximately 120 microns. According to other exemplary embodiments, the carrier sheets 113, 114 may, for example, be coupled together in other manners (e.g., laminating without heat or pressure). Further, the sensor sheet 100 and/or sensors 110 may have a different total thickness (e.g., greater than or equal to approximately 70 microns).

Now referring to FIG. 6, a graph 600 of the Resistance v. Force characteristics of a sensor 110 is shown. The resistance of the sensor 110 is shown on the Y-axis, and the force acting upon the sensor 110 is shown on the X-axis. At relatively low forces (e.g., at point 610 below approximately 1 N), the sensor 110 exhibits relatively high resistance characteristics (e.g., approximately 300 kilohms or higher) behaving substantially as an isolator. At relatively high forces (e.g., at point 620 above approximately 3 N), the sensor 110 exhibits relatively low resistance characteristics (e.g., approximately 1 kilohm or lower) approaching behaving substantially as a conductor. Between approximately 1 N and 3 N, the sensor 110 exhibits intermediate levels of resistance between approximately 3 kilohms and 1 kilohm that decreases in a predictable manner with increasing force.

The conductive or electrical characteristics of the sensor 110 (i.e., the Resistance v. Force characteristic curve 600) may configured according to the selection of different materials and providing different arrangements of the carrier sheets 113, 114, conductors 111, 112, electrodes 115, 116, and pressure sensitive material 117. For example, as described above, the conductive layers of the sensor 110 (i.e., the conductors 111, 112, electrode 115, 116, and pressure sensitive material 117) may be configured in different manners, such as with different materials and/or different thickness, to change the conductive or electrical characteristics of the sensor 110. The type of material may also be used to tune the characteristics of the sensor 110. For example, a particular QTC material be selected (e.g., a polymer, a conductor blend, etc.) to affect the conductive or electrical characteristics.

The carrier sheets 113, 114, may also be configured in different manners to change the conductive or electrical characteristics of the sensor 110. For example, the relative position of the carrier sheets 113, 114, may be adjusted. Referring to FIG. 5, the carrier sheets 113, 114 may be spaced apart in regions proximate the sensor 110 so as to provide a gap (as shown) between the pressure sensitive material 117 and the electrode 115. By providing a gap, a sufficient force must act upon the carrier sheets 113, 114 to deflect a corresponding distance before force acts upon the pressure sensitive material. Thus, referring to the graph of FIG. 6, the Resistance v. Force characteristics of the sensor 110 may be shifted rightward by a desired force offset (i.e., number of Newtons) by providing a gap of a certain size (e.g., 35 microns) corresponding to the spring rate of the carrier sheets 113, 114. The gap may, for example, be provided by an adhesive used to combine the carrier sheets 113, 114. According to another exemplary embodiment, the sensor 110 may be preloaded to have the opposite effect of a gap, such as with an externally provided physical load, effectively shifting the Resistance v. Force characteristics of the sensor 110 leftward.

The conductive or electrical characteristics of the sensor 110 may also be changed according to the materials used for the carrier sheets 113, 114. A stiffer first or outer carrier sheet 113 may be provided, such as by utilizing a thicker material or a different material. By using a stiffer outer sheet 113, greater force must act upon the outer carrier sheet 113 to deflect a similar distance as compared to a less stiff material. Thus, referring to the graph of FIG. 6, the Resistance v. Force characteristics of the sensor 110 are elongated or extended (not shifted) rightward, such that for higher loads result, incremental changes of force result in larger changes of resistance to allow for more accurate detection by the controller or measuring device. The inner sheet 114 may also be configured to provide a stable base and may have a lower, same, or higher stiffness than the outer sheet 113.

While the sensors 110 have been described as being responsive to compressive loads, the sensors 110 are also responsive to bending loads that cause deflection of the carrier sheets 113, 114 and pressure sensitive material 117. Thus, for simple and/or reliable calibration, the pressure sensors 110 are maintained in a generally flat arrangement where measurements for compressive loads are desired. According to other exemplary embodiments, the sensors 110 may be utilized in applications where measurements for torsional loads are desired.

Although specific shapes of each element have been set forth in the drawings, each element may be of any other shape that facilitates the function to be performed by that element. For example, the pressure sensing materials have been shown to be rectangular, however, in other exemplary embodiments the structure may define pressure sensing materials of other shapes. Further, while a specific form of an occupant classification system has been shown in FIGS. 1-3, according to other exemplary embodiments, the system may be in other forms or include pressure sensing materials in other locations.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature As utilized herein, the twits "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the occupant sensing system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present embodiments.

What is claimed is:

1. An occupant sensing system for a vehicle, comprising:
a pressure sensitive material installed in a plurality of pressure sensing zones, a first pressure sensing zone being arranged in a vehicle seat and a second pressure sensing zone disposed outside of the vehicle seat, the pressure sensitive material of the first pressure sensing zone configured to provide a first electrical signal to a controller indicative of a force applied to the vehicle seat and the pressure sensitive material of the second pressure sensing zone configured to provide a second electrical signal to a controller indicative of an offloading force applied outside of the vehicle seat, the pressure sensitive material of each of the first and second zones having a respective at least one of a variable resistance and a variable capacitance based on the amount of force that is applied to the pressure sensitive material, wherein the first and second electrical signals include information indicative of the at least one of the variable resistance and the variable capacitance associated with the pressure sensitive material of the first and second zones, respectively, wherein the controller estimates the weight of an occupant based, at least in part, on the force applied to the vehicle seat and the offloading force.

2. The system of claim 1, wherein the pressure sensitive material comprises at least one of a quantum tunneling compound, a carbon nanotube conductive polymer, and graphene.

3. The system of claim 1, wherein the first pressure sensing zones comprises at least one of a seat base, a seat back, and a headrest, and the second pressure sensing zone corn rises at least one of a door armrest, a center console or armrest, and a floor.

4. The system of claim 1, wherein the controller provides electrical signals to a vehicle display or indicator for providing information to the driver regarding seatbelt usage information.

5. The system of claim 1, wherein the controller controls at least one of driver airbag usage, passenger airbag usage, side airbag usage, and seatbelt tension based on at least one of the estimated weight of the occupant.

6. The system of claim 1, wherein each pressure sensing zone comprises multiple pressure sensors having the pressure sensitive material.

7. The system of claim 1, further comprising first and second pairs of electrodes configured to receive the first and second electrical signals, respectively, and provide the received first and second electrical signals to the controller.

8. An occupant classification system for a vehicle, comprising:
an array of sensors installed in a plurality of pressure sensing zones, a first pressure sensing zone being arranged in a vehicle seat and a second pressure sensing zone disposed outside of the vehicle seat, the first pressure sensing zone comprising a first sensor having pressure sensitive material configured to provide a first electrical signal to a controller indicative of a force applied to the vehicle seat and the second pressure sensing zone comprising a second sensor having pressure sensitive material configured to provide a second electrical signal to a controller indicative of an offloading force applied outside of the vehicle seat, the pressure sensitive material of each of the first and second zones having a respective at least one of a variable resistance and a variable capacitance based on the amount of force that is applied to the pressure sensitive material, wherein the first and second electrical signals include information indicative of the at least one of the variable resistance and the variable capacitance associated with the pressure sensitive material of the first and second zones, respectively, wherein the controller estimates the weight of an occupant based, at least in part, on the force applied to the vehicle seat and the offloading force.

9. The system of claim 8, wherein the pressure sensitive material comprises at least one of a quantum tunneling compound, a carbon nanotube conductive polymer, and graphene.

10. The system of claim 8, wherein the first pressure sensing zone comprises at least one of a seat base, a seat back, and a headrest, and the second pressure sensing zone comprises at least one of a door armrest, a center console or armrest, and a floor.

11. The system of claim 8, wherein the controller controls at least one of driver airbag usage, passenger airbag usage, side airbag usage, and seatbelt tension based on at least one of the estimated weight of the occupant.

12. The system of claim 8, further comprising first and second pairs of electrodes configured to receive the first and second electrical signals, respectively, and provide the received first and second electrical signals to the controller.

13. An occupant detection system for a vehicle, comprising:
a plurality of pressure sensing zones, a first pressure sensing zone being arranged in a vehicle seat and a second pressure sensing zone disposed outside of the vehicle seat, the first pressure sensing zone comprising a first sensor having pressure sensitive material configured to provide a first electrical signal to a controller indicative of a force applied to the vehicle seat and the second pressure sensing zone comprising a second sensor having pressure sensitive material configured to provide a second electrical signal to a controller indicative of an offloading force applied outside of the vehicle seat, the controller determining occupant presence based on at least one of the first or second electrical signal, the pressure sensitive material of each of the first and second zones having a respective at least one of a variable resistance and a variable capacitance based on the amount of force that is applied to the pressure sensitive material, wherein the first and second electrical signals include information indicative of the at least one of the variable resistance and the variable capacitance associated with the pressure sensitive material of the first and second zones, respectively, wherein the controller estimates the weight of an occupant based, at least in part, on the force applied to the vehicle seat and the offloading force.

14. The system of claim 13, wherein the pressure sensitive material comprises at least one of a quantum tunneling compound, a carbon nanotube conductive polymer, and graphene.

15. The system of claim 13, wherein the first pressure sensing zones comprises at least one of a seat base, a seat back, and a headrest, and the second pressure sensing zone comprises at least one of a door armrest, a center console or armrest, and a floor.

16. The system of claim 13, wherein the controller provides electrical signals to a vehicle display or indicator for providing information to the driver regarding seatbelt usage information.

17. The system of claim 13, wherein the controller controls at least one of driver airbag usage, passenger airbag usage, side airbag usage, and seatbelt tension based on the determined occupant presence.

18. The system of claim 13, further comprising first and second pairs of electrodes configured to receive the first and second electrical signals, respectively, and provide the received first and second electrical signals to the controller.

* * * * *